(12) United States Patent
Nishikawa

(10) Patent No.: US 6,997,662 B2
(45) Date of Patent: Feb. 14, 2006

(54) ATTACHMENT CLIP AND ATTACHMENT STRUCTURE USING SAME

(75) Inventor: Masaharu Nishikawa, Hadano (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/624,559

(22) Filed: Jul. 23, 2003

(65) Prior Publication Data
US 2004/0081537 A1    Apr. 29, 2004

(30) Foreign Application Priority Data
Aug. 9, 2002    (JP) ............................ P2002-232343

(51) Int. Cl.
*F16B 37/16*    (2006.01)

(52) U.S. Cl. ...................... 411/437; 411/433; 411/525; 411/526; 411/527

(58) Field of Classification Search ................ 411/433, 411/437, 525, 526, 527
See application file for complete search history.

(56) References Cited

U.S. PATENT DOCUMENTS

| | | | | |
|---|---|---|---|---|
| 2,288,710 A | * | 7/1942 | Hotchkin | 411/520 |
| 2,408,573 A | * | 10/1946 | Morehouse | 411/520 |
| 3,203,302 A | * | 8/1965 | Frederick | 411/520 |
| 4,911,594 A | * | 3/1990 | Fisher | 411/437 |
| 5,707,193 A | * | 1/1998 | Hasegawa | 411/433 |

* cited by examiner

*Primary Examiner*—Katherine Mitchell
(74) *Attorney, Agent, or Firm*—McDermott Will & Emery LLP

(57) ABSTRACT

An attachment clip 10 is provided to attach a heat shielding plate 4 to an under-panel 2. The under-panel 2 has a bolt 5 projecting from a floor tunnel 2a. The heat shielding plate 4 has a bolt hole 4a formed to allow passage of a shank 5a of the bolt 5. The attachment clip 10 has a clip body 11 having an abutting part 13 for abutment on the heat shielding plate 4. The abutting part 13 has a shank hole 12 for passage of the shank 5a of the bolt 5. The attachment clip 10 further includes six engagement claws 10A–10F projecting from the inner periphery of the clip body 11 inwardly. The engagement claws 10A–10F have respective engagement tips 10a–10f formed to depart from the clip body 11 along the axial direction of the attachment chip 10, providing a substantial cone-shaped configuration. The engagement claws 10A–10F elastically engage with threads of the shank 5a while urging the heat shielding plate 4 toward the under-panel 2 along the axial direction of the bolt 5.

5 Claims, 10 Drawing Sheets

ATTACHMENT CLIP AND ATTACHMENT STRUCTURE USING SAME

BACKGROUND OF THE INVENTION

1. Field of the Invention

The present invention relates to an attachment clip suitable for a vehicle and an attachment structure using the attachment clip.

2. Description of Related Art

FIGS. 1 to 4 show an attachment clip which is used to attach car components, such as heat shield plate for insulating heat of a muffler etc. underside the vehicle, that are apt to be influenced by heat.

In the attachment structure using the attachment clip like this, a vehicle body 1a is provided, on its underside 1a, with an under-panel 2 as an "attached" member.

In the under-panel 2, a floor tunnel 2a is formed so as to swell upward at a substantial center in the width direction of the vehicle, having a hat-shaped section.

Attached below the floor tunnel 2a is a heat shield plate 4 which shields the under-panel 2 from heat of a muffler 3, as an "attaching" member.

On the under-panel 2, bolts 5 are arranged to project downward through through-holes 4a of the heat shielding plate 4.

Through the heat shielding plate 4, each of the bolts 5 has a shank 5a that is engaged with an attachment clip 6. The attachment clip 6 has an abutting part 6a in the form of a circular plate, for abutment on the lower face of the shielding plate 4. The abutting part 6a is provided, at a center thereof, with a shank hole 6b into which the shank 5a of the bolt 5 is to be inserted.

About the periphery of the circular abutting part 6a, a pair of claw parts 6c, 6c are formed to extend outward while interposing the shank hole 6b therebetween. On the way to extend outward, each of the claw parts 6c, 6c is folded back and downward to enable its elastic deformation.

The claw parts 6c, 6c have respective oblique sides 6d, 6d each formed, in its folded state, with a designated angle so as to follow an angle of respective thread ridges on the shank 5a.

Further, the attachment clip 6 is provided, between the abutting part 6a and the shank hole 6b, with a slanted guide part 6e. In production, this slanted guide part 6e is formed at the same time of punching a sheet metal into the attachment clip 6. Alternatively, the slanted guide part 6e may be formed by means of squeezing succeeding to the punching process of a sheet metal.

While arranging the lower face of the floor tunnel 2a over the heat shielding plate 4, the so-formed attachment clip 6 is fitted to the shank 5a of the bolt 5 projecting from the through-hole 4a of the heat shielding plate 4 downward.

In the process of fitting the attachment clip 6, the leading end of the shank 5a of the bolt 5 comes into contact with the slanted guide part 6e. Then, owing to its slanted configuration, the slanted guide part 6e serves to introduce the leading end of the shank 5b into the shank hole 6b, thereby aligning the bolt 5 with the attachment clip 6 and allowing the shank 5b to be inserted into the shank hole 6b with ease.

Subsequently, the oblique sides 6d, 6d of the claw parts 6c, 6c surmount the thread ridges on the shank 5a, so that the bolt 5 is engaged with the attachment clip 6.

In a state that the heat shielding plate 4 is attached to the lower face of the under-panel 3 while being urged toward the under-panel 2 along the axial direction of the bolt 5 by the elastic forces of the claw parts 6c, 6, the attachment clip 6 is carried so as not to fall off the bolt 5.

In this way, the attachment clip 6 in the earlier technology enables a worker to attach the heat shielding plate 4 to the under-panel 2 easily and blind in spite of restricted working circumstances, for example, the underside of vehicle.

Noted that since the attachment clip 6 is made of metal exhibiting high heat-resistance in comparison with resinous clips, there is no possibility of melting despite that the attachment clip 6 comes in direct contact with the heat shielding plate 4 shielding heat from the muffler 3.

SUMMARY OF THE INVENTION

However, it should be noted that the shank hole 6b in the above-mentioned attachment clip 6 is arranged to be lower than the abutting part 6a due to the presence of the slanted guide part 6e.

Also noted the claw parts 6c, 6c extending from the periphery of the circular abutting part 6a are folded back inward and downward of the shank hole 6b.

Therefore, since respective tips of the claw parts 6c, 6c are further arranged lower than the shank hole 6b, the whole attachment clip 6 is large-sized with its increased height due to the above arrangement of various parts forming the attachment clip 6. Correspondingly, the bolt 5 for engagement with the attachment clip 6 has to be designed with the bolt 5a having an increased height.

Therefore, the attachment clip 6 is unsuitable for attachment of components under restricted working circumstances such that the clip 6 attached to the lower face 1a of the vehicle body 1 might interfere with a road face.

Additionally, the attachment clip 6 is shaped to be large in its unfolded configuration, requiring much material to be punched out, as shown in FIG. 3.

In other words, since the attachment clip 6 has a structure where the claw parts 6c, 6c once extend from the periphery of the circular abutting part 6a outward and are subsequently folded back inward, the ratio of an area occupied by the claws part 6c, 6c to an circular area occupied by the abutting part 6a is large.

Therefore, in the production of the attachment clips 6, there is a tendency to increase material cost and make it difficult to punch out several clips 6 from a piece of metal plate, reducing a yield rate in producing the clips 6.

Further, there is a problem of increasing the weight of the engagement claws 6c, 6c.

As for the manufacturing process, it is noted that the slanted guide part 6e is squeezed inward simultaneously with or after punching a material in order to enable elastic deformation of the clip 6.

Additionally, after squeezing the slanted guide part 6e, the engagement claws 6c, 6c have to be folded back toward the underside of the shank hole 6b. In this way, the above clip 6 is produced as a result of completing several manufacturing processes.

Thus, also from this point of view, there exists a problem of causing an increase of the manufacturing cost.

It is further noted that the above-mentioned attachment clip 6 comes into surface-contact with the heat shielding plate 4 due to the annular abutting part 6a annular-shaped with a predetermined width. Therefore, due to the largeness in contact area of the clip 10 with the heat shielding plate 4, the clip 10 is easy to produce rust easily.

Under the above circumstance, an object of the present invention is to provide an attachment clip which can be used even in a restricted installation space, such as underside of vehicle, and which can suppress increasing of the manufacturing cost with the characteristics of weight-saving, enhanced heat-resistance and rust-proof. Further, another object of the present invention is to provide an attachment structure using such an attachment clip.

According to the present invention, the above-mentioned object is accomplished by an attachment clip for attaching a first member to a second member having a bolt projecting therefrom, the first member having a bolt hole formed to allow passage of a shank of the bolt, the attachment clip comprising: a clip body having an abutting part for abutment on the first member, the abutting part having a shank hole for passage of the shank of the bolt; and a plurality of engagement claws formed around the shank hole so as to project from the inner periphery of the clip body to the shank hole inwardly in the radial direction and also inclined to the clip body so that respective engagement tips of the engagement claws depart from the clip body along an axial direction of the attachment chip, thereby providing the engagement claws as a whole with a substantial cone-shaped configuration, wherein the engagement claws can engage with the shank of the bolt of the second member while urging the first member toward the second member along an axial direction of the bolt.

According to the present invention, there is also provided an attachment structure comprising: a first member having a first bolt hole formed to allow passage of the shank of the bolt; a second member integrally formed with a bolt having a root and a shank extending from the root; and an attachment clip which is engageable with the bolt to attach the first member to the second member, the attachment clip including a clip body having an abutting part for abutment on the first member, the abutting part having a shank hole allowing passage of the shank of the bolt and a plurality of engagement claws formed around the shank hole so as to project from the inner periphery of the clip body inwardly in the radial direction of the shank hole, the engagement claws inclined to the clip body so that respective engagement tips of the engagement claws depart from the clip body along an axial direction of the attachment chip, thereby providing the engagement claws as a whole with a substantial cone-shaped configuration, wherein the engagement claws is engaged with the shank of the bolt while interposing the first member between the clip body and the second member and also urging the first member toward the second member along an axial direction of the bolt.

DESCRIPTION OF THE PREFERRED EMBODIMENT

Figure 1:
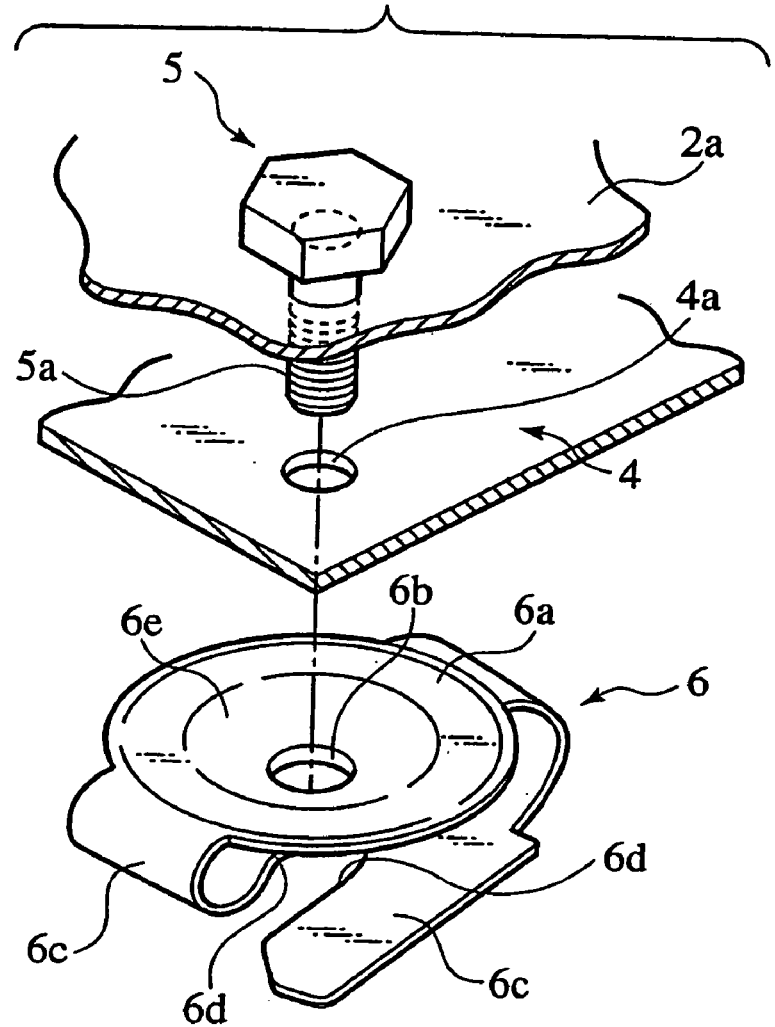
FIG. 1 is an exploded perspective view showing the essential part of an attachment clip in earlier technology and an attaching structure using the attachment clip.
Figure 2:
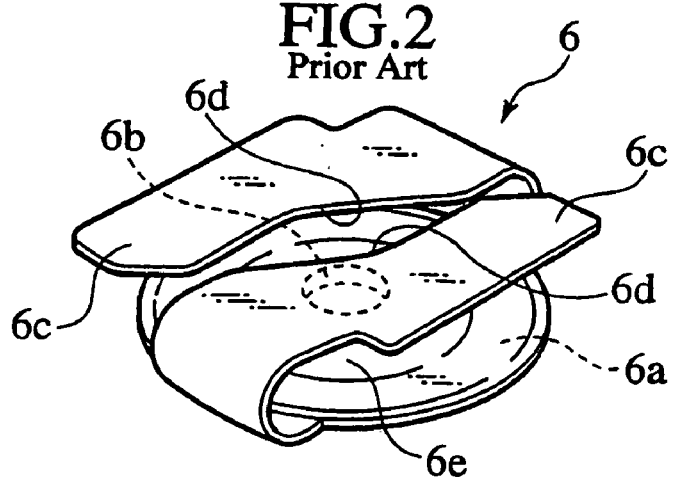
FIG. 2 is a perspective view showing the back side of the attachment clip of FIG. 1.
Figure 3:
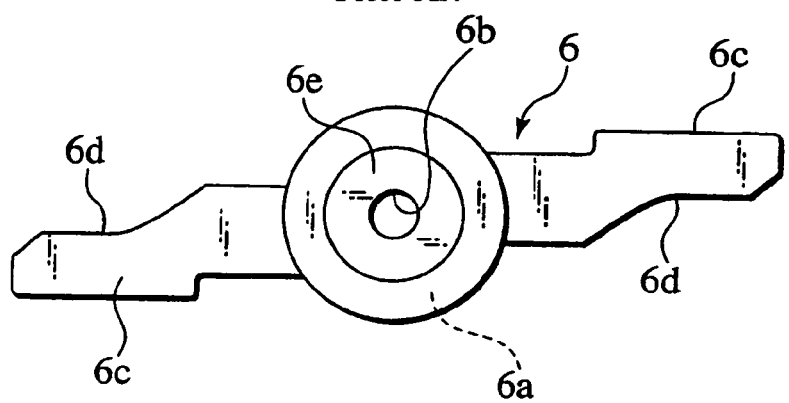
FIG. 3 is a plane view of the attachment clip of FIG. 1 in its unfolded state after punching out.
Figure 4:
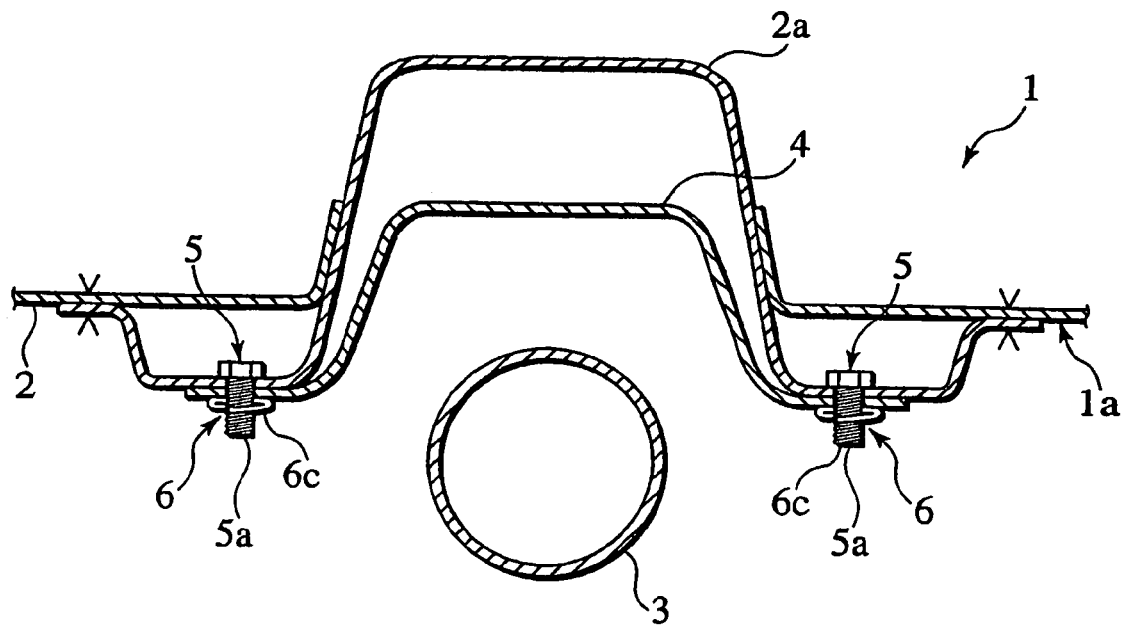
FIG. 4 is a sectional view of the attachment clip and the attaching structure of FIG. 1 along the width direction of a vehicle, showing the attaching structure below the lower part of the vehicle.

Referring to the accompanying drawings, an embodiment of the present invention will be described below.

FIGS. 5 to 15 are views showing an attachment clip in accordance with the first embodiment of the present invention and an attachment structure using the above attachment clip.

Noted that elements similar to those of the afore-mentioned clip and attachment structure in earlier technology are indicated with the same reference numerals, respectively.

Figure 5:
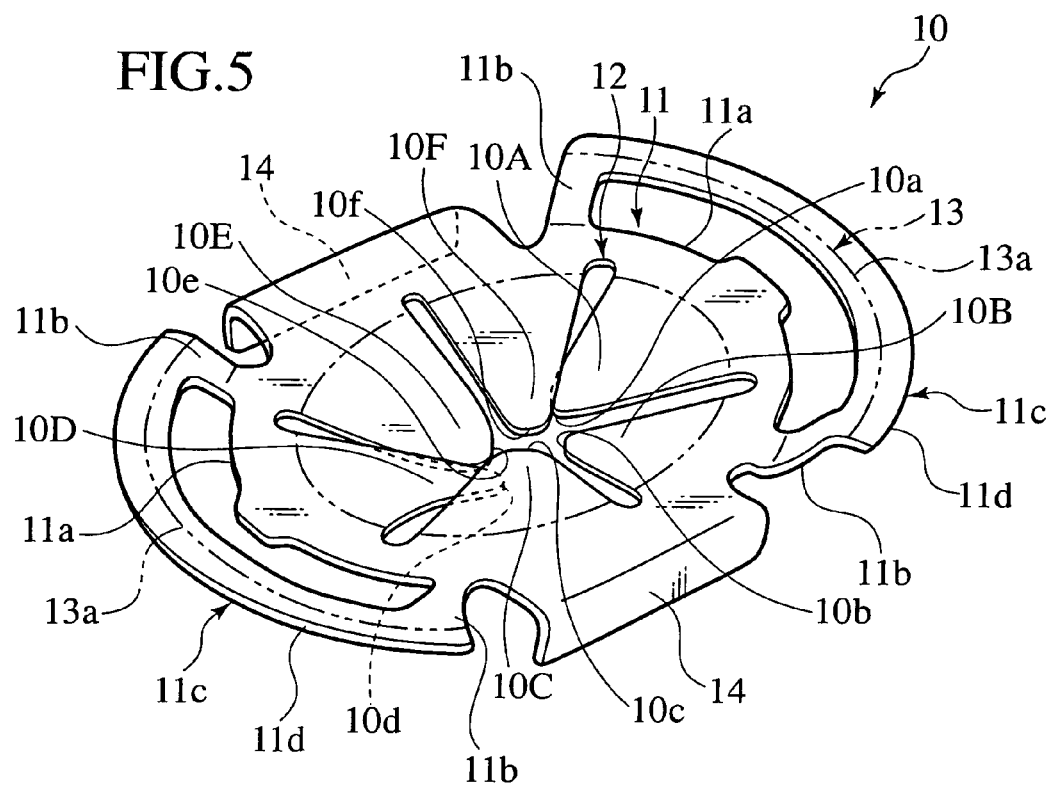
FIG. 5 is a perspective view of an attachment clip in accordance with the first embodiment of the present invention.
Figure 6:
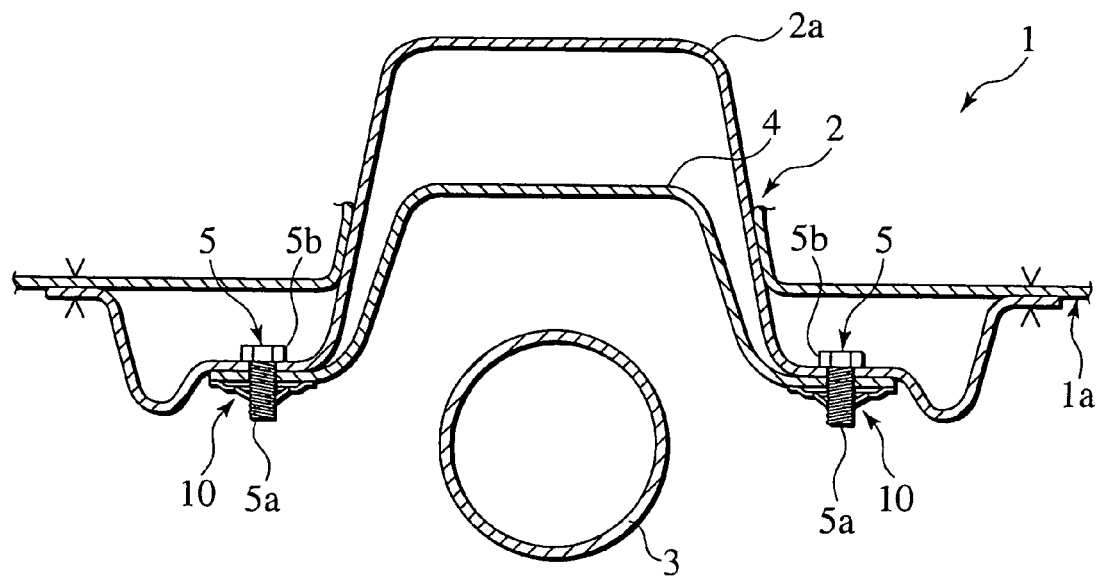
FIG. 6 is a sectional view of the attachment clip of FIG. 5 along the width direction of a vehicle, showing the attaching structure below the lower part of the vehicle.

In these figures, FIG. 5 shows the attachment clip of the first embodiment, while FIG. 6 shows a pair of attachment structures each using the attachment clip of FIG. 5.

In FIG. 6, similarly, a vehicle body 1a is provided, on its underside 1a, with an under-panel 2 as an "attached" member (the second member).

In the under-panel 2, a floor tunnel 2a is formed so as to swell upward at a substantial center in the width direction of the vehicle, having a hat-shaped section.

Attached below the floor tunnel 2a is a heat shielding plate 4 which shields the under-panel 2 from heat of a muffler 3, as an "attaching" member (the first member).

On the under-panel 2, a pair of bolts 5 are arranged on both sides of the muffler 3 so as to project downward through through-holes (the first bolt holes) 4a of the heat shielding plate 4. Noted that, the under-panel 2 has also through-holes (the second bolt holes) formed to allow passage of the bolts 5.

Figure 7:
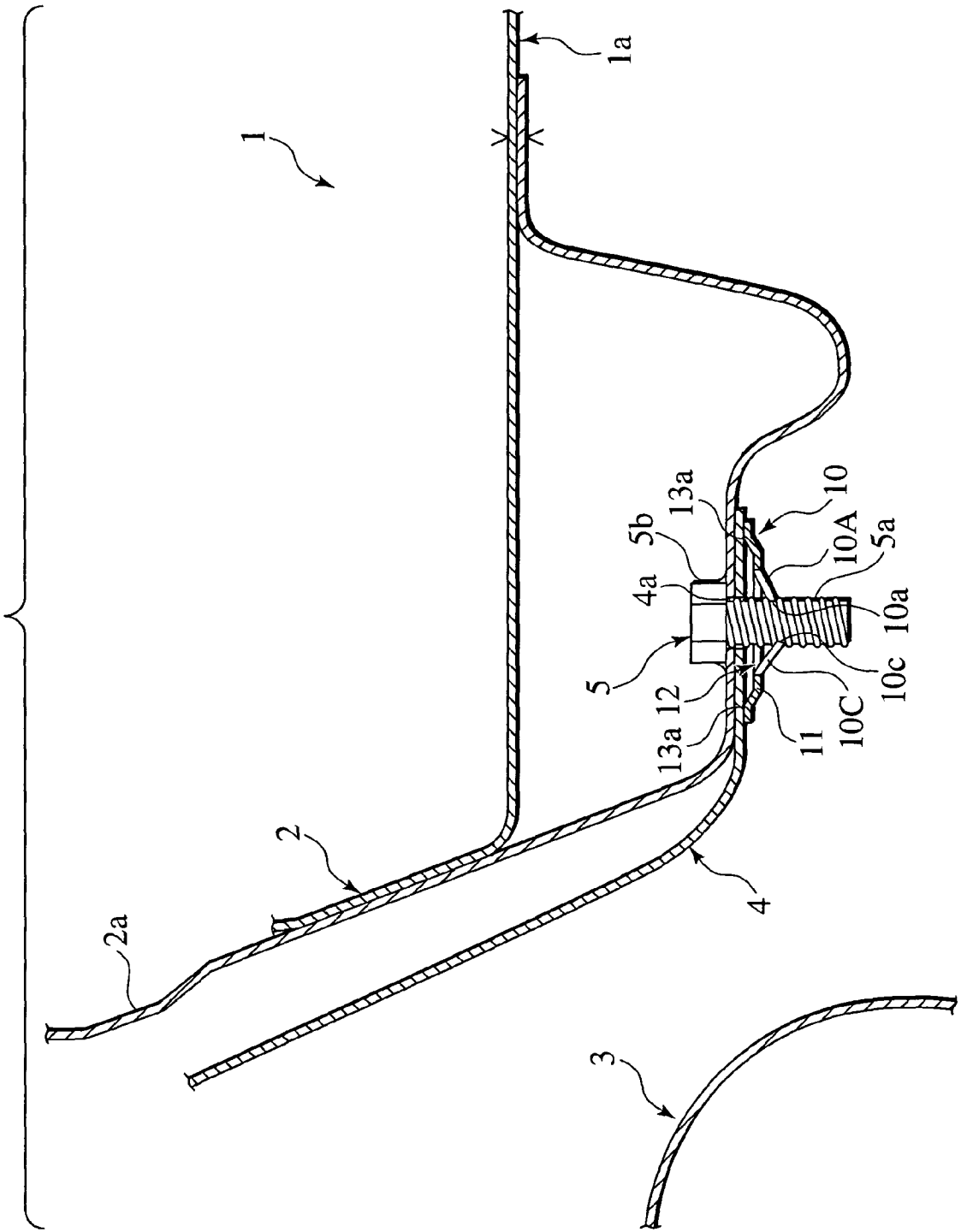
FIG. 7 is an enlarged sectional view showing the essential part of the attachment clip of the first embodiment and the attaching structure using the attachment clip.

As shown in FIG. 7, a head part 5b of each bolt 5 forming its root is welded to the floor tunnel 2a of the under-panel 2 in advance.

The bolt 5 has a shank 5a inserted into the through-hole 4a of the heat shielding plate 4. In arrangement, the heat shielding plate 4 is interposed between the floor tunnel 2a and the attachment clip 10. In engagement, engagement claws 10A to 10F of the clip 10 are engaged with the shank 5a of the bolt 5.

Due to elastic force of repulsion of the engagement claws 10A to 10F, the heat shielding plate 4 is urged toward the under-panel 3 along the axial direction of the bolt 5, so that the attachment of the heat shielding plate 4 to the under-panel 3 can be retained.

The attachment clip 10 has a clip body 11 in the form of a substantial-circular disk. At the substantial-center of the clip body 11, a shank hole 12 is formed to allow passage of the shank 5a of the bolt 5.

The engagement claws 10A to 10F of six pieces are arranged to project from the inner edge of the shank hole 12 inward in the radial direction of the clip 10.

Figure 8:
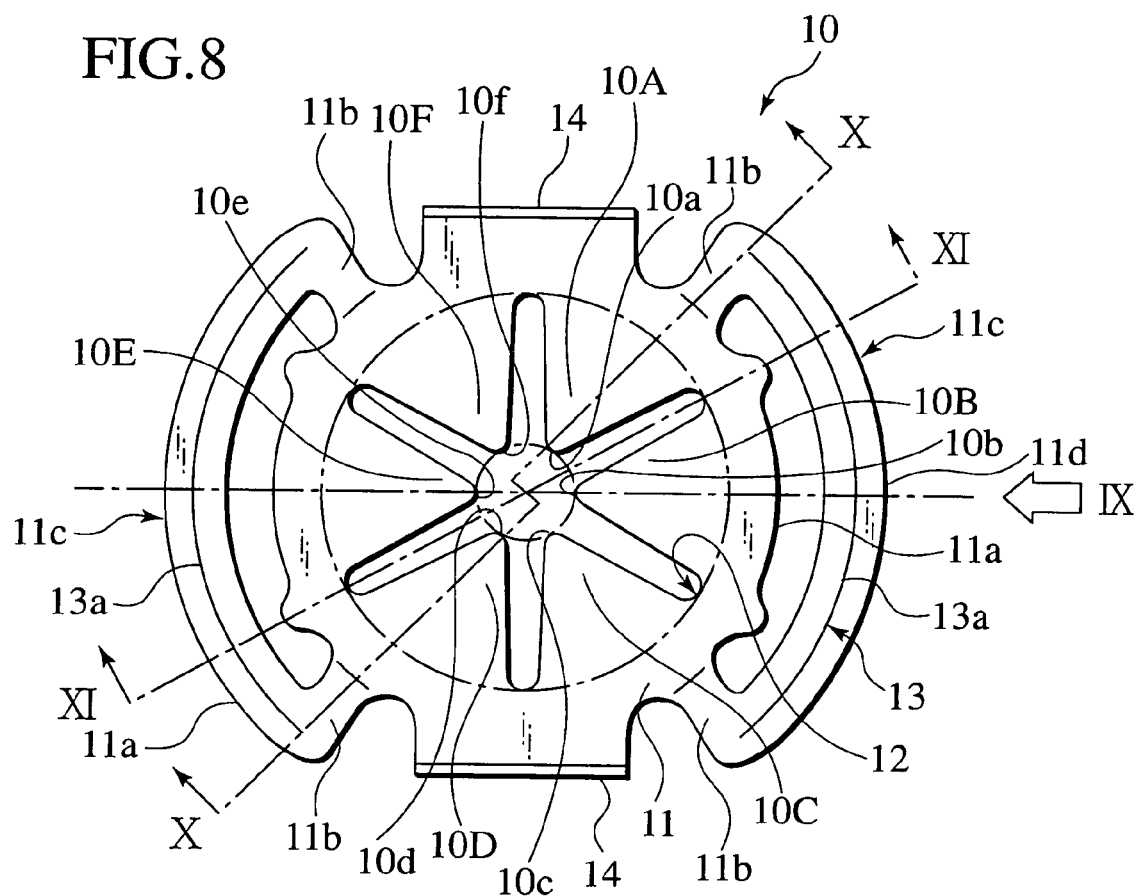
FIG. 8 is a bottom view of the attachment clip of the first embodiment.

As shown in FIG. 8, the engagement claws 10A to 10F are shaped to be substantial triangles whose summits consist of engagement tips 10a to 10f, respectively. The clip body 11 is cone-shaped so that the engagement claws 10A to 10F depart from the under-panel 2 gradually along the axial direction of the clip 10.

Owing to the formation of a cone-shaped hollow composed of the engagement claws 10A to 10F, the engagement tips 10a to 10f are adapted so as to enter roots 5c (FIG. 14) of the shank 5a. Therefore, as shown in FIG. 5, the engagements of the engagement tips 10a to 10f with side faces of threads 5d of the shank 5a are established so that respective distances between the engagement points and the abutting part 13 can be represented by different distances h1 to h3 in the axial direction of the shank 5a.

Figure 15:
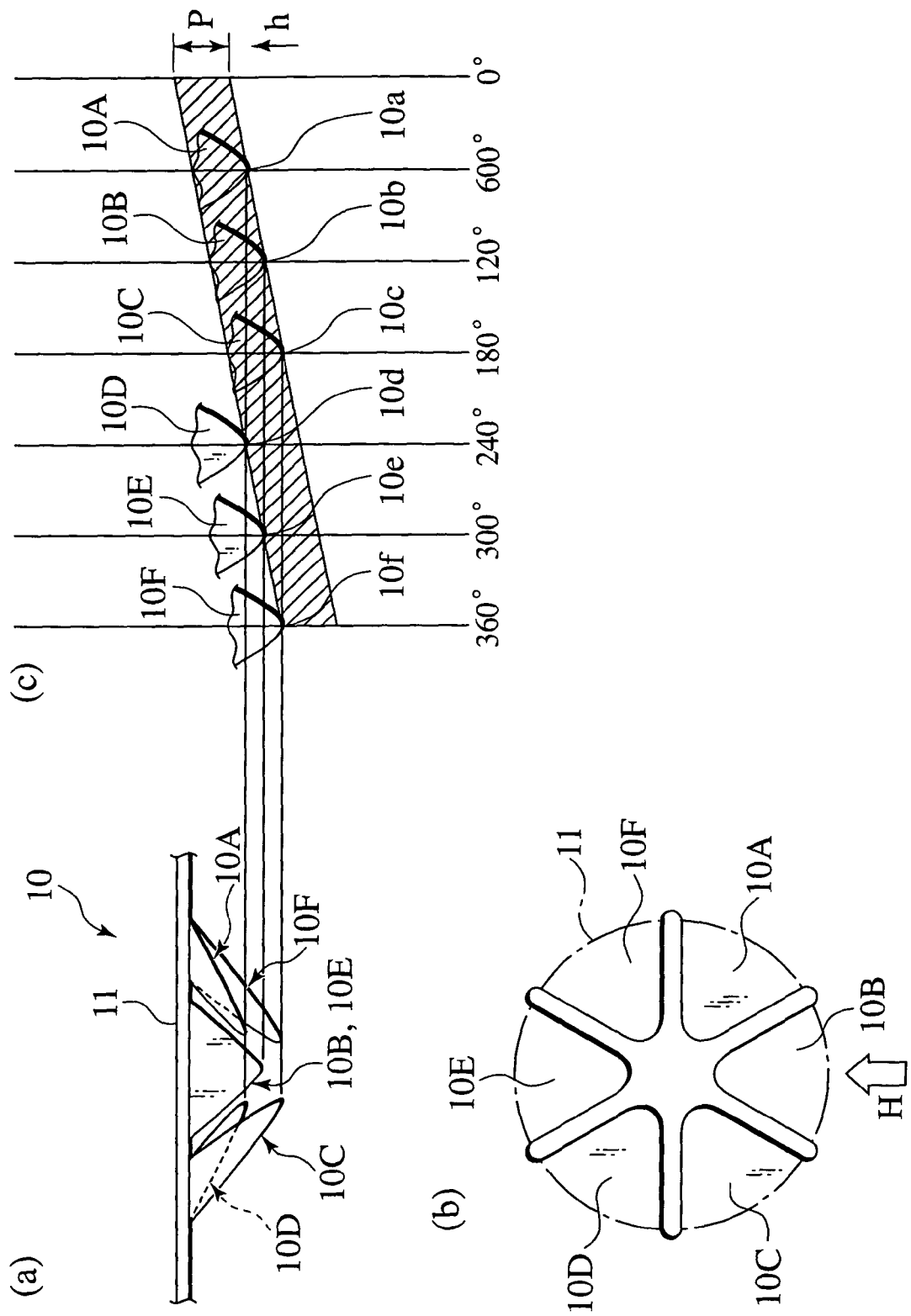
FIG. 15 is a schematic diagram of the attachment clip of the first embodiment wherein (a) shows a side view of the engagement claws of the attachment clip, (b) a plan view of the engagement claws and (c) is a pattern view for explaining the heights of the engagement claws corresponding to the view (a)

More in detail, as shown in FIG. 15, the engagement tips 10a, 10f and 10c, 10d of the adjoining engagement claws 10A, 10F and 10C, 10D are positioned so as to be different from each other in the direction of height (level), by one pitch p of the threads 5d.

Additionally, as shown in FIG. 8, the attachment clip 10 is provided, along an outer periphery 11a of the clip body 11, with a pair of outer flanges 11c, 11c connected with the body 11 through plate-spring parts 11b, 11b.

According to the first embodiment of the invention, the abutting part 13 is formed, in the top view of FIG. 8, with semi-arc abutting lines 13c, 13c extending along outer edges 11d, 11d of the outer flanges 11c, 11c.

Figure 10:
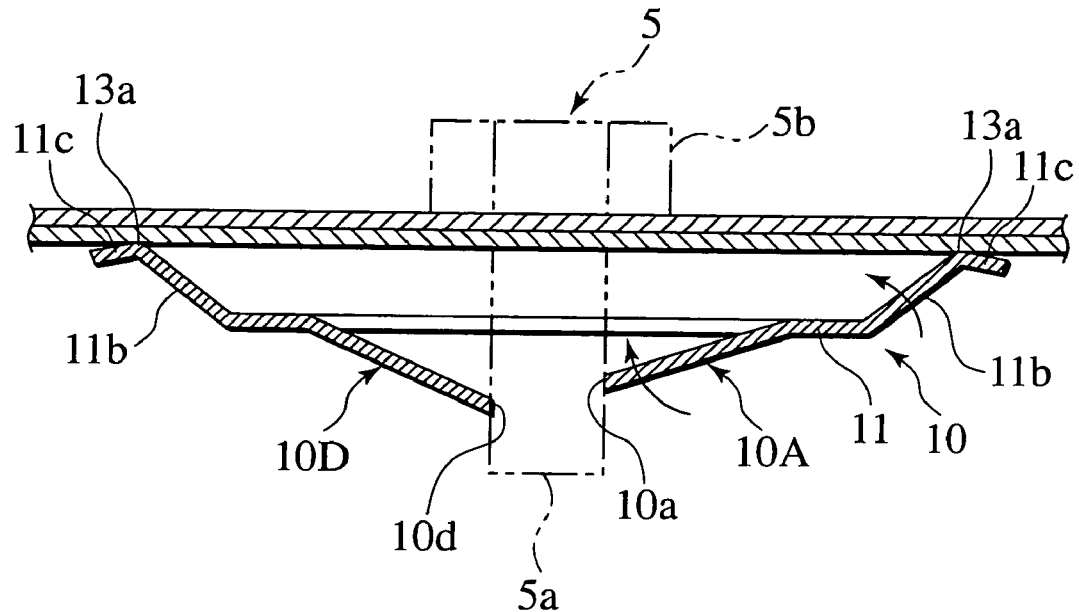
FIG. 10 is a sectional view of the attachment clip of the first embodiment, taken along a line X—X in FIG. 8.
Figure 11:
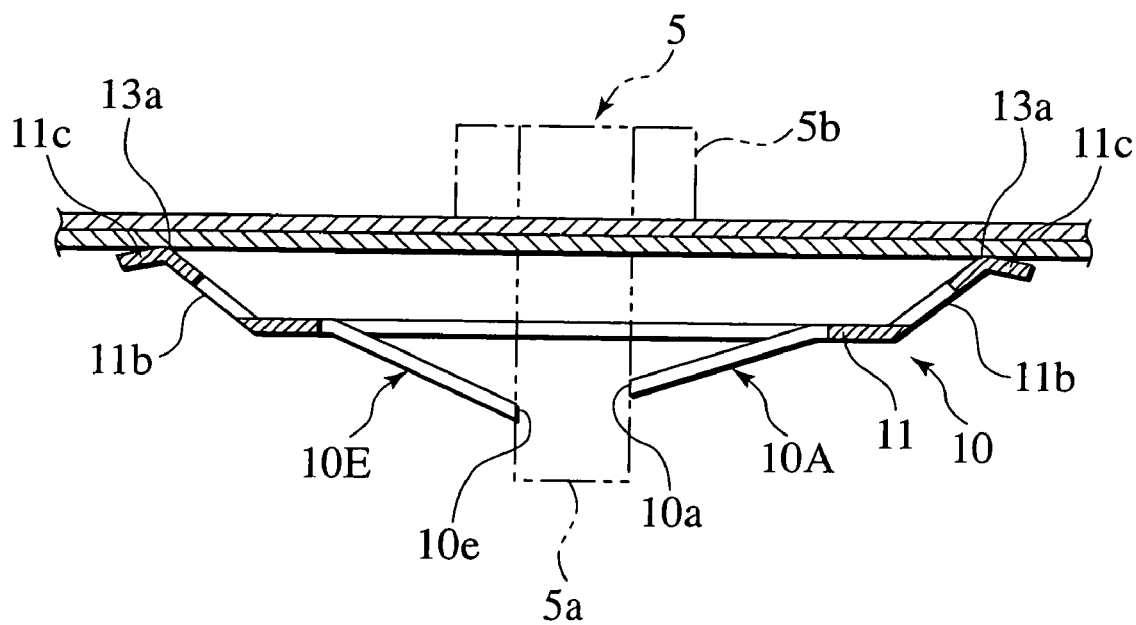
FIG. 11 is a sectional view of the attachment clip of the first embodiment, taken along a line XI—XI in FIG. 8.
Figure 12:
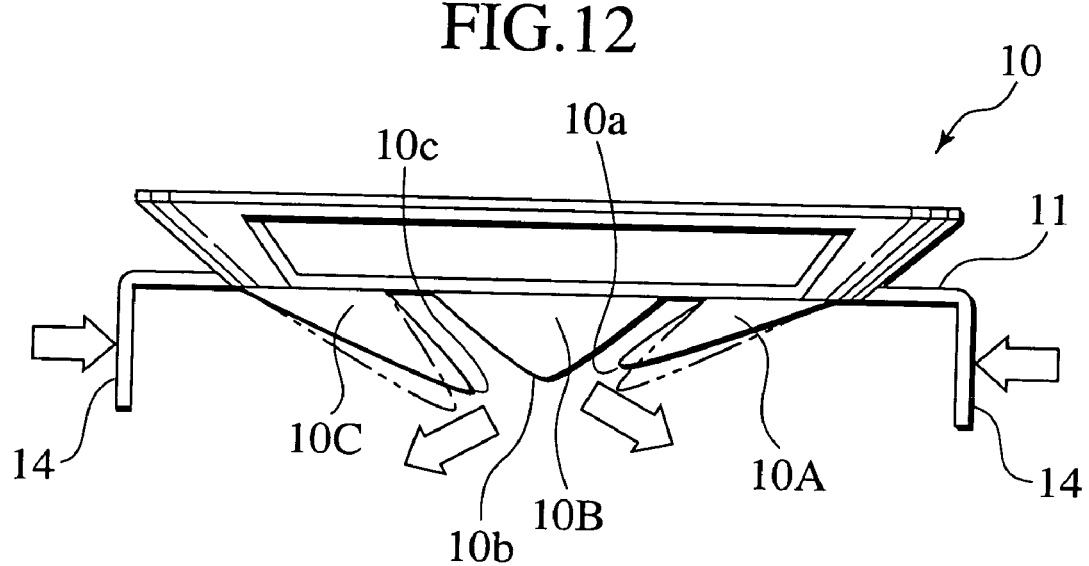
FIG. 12 is a side view of the attachment clip of the first embodiment, explaining a condition to pinch a vertical part of a knob of the clip.

As shown in FIGS. 10 and 11, the outer flanges 11c, 11c are connected with the clip body 11 through the plate-spring parts 11b, 11b while providing body portions at different heights.

Figure 9:
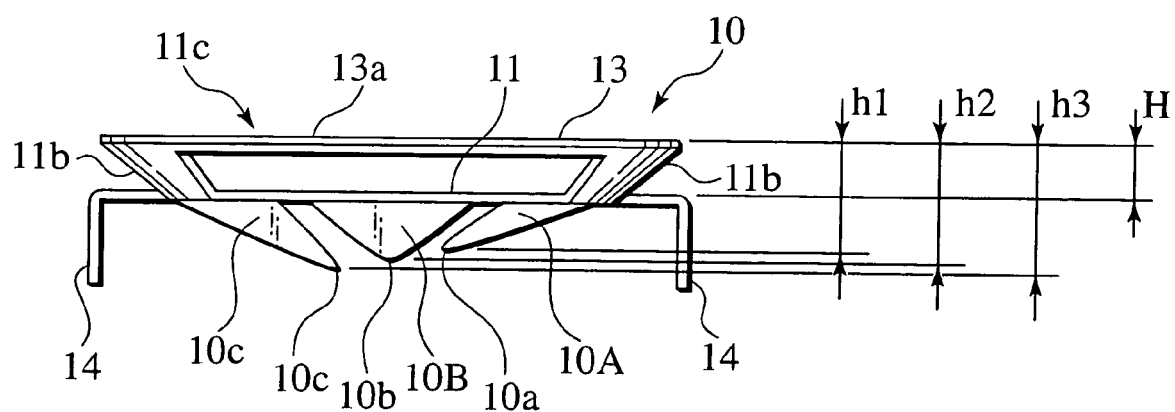
FIG. 9 is a side view of the attachment clip of the first embodiment, viewed from a direction of arrow IX in FIG. 8.

In the direction of height of the clip 10, the clip body 11 is apart from the outer flanges 11c, 11c by a predetermined distance H, as shown in FIG. 9.

Further, the clip body 11 of the embodiment has a pair of vertical knobs 14, 14 opposing each other on both sides of the shank hole 12.

The operations of the attachment clip 10 and the attachment structure using the clip 10 will be described below.

According to the first embodiment of the invention, by one punching process in the manufacturing process of the attachment clip 5, the engagement claws 10A to 10F are respectively inclined to the clip body (flattened part) 11 so as to provide a conical-shaped configuration. At the same time of punching, the vertical knobs 14, 14 are together folded.

As shown in FIGS. 6 and 7, the attachment clips 10, 10 constructed above are fitted to the shanks 5a of the bolts 5 projecting from the heat shielding plate 4 downward. At this time, the heat shielding plate 4 is pinched between the underface of the floor tunnel 2a and each of the attachment clips 10, 10. The shank 5a of each bolt 5 projecting from the through-hole (the first bolt hole) 4a of the heat shielding plate 4 is inserted into the shank hole 12.

In process of fitting the attachment clip 10 to the bolt 5 projecting from the heat shielding plate 4 downwardly, the tip of the shank 5a of the bolt 5 is guided by the engagement claws 10A to 10F projecting from the inner periphery of the shank hole 12 inwardly and finally disposed among the engagement claws 10A to 10F.

As for the attachment clip 10 having the engagement claws 10A to 10F among which the shank 5a of the bolt 5 is inserted, the engagement claws 10A to 10F surmounting the threads 5d are respectively engaged with the side faces of the roots 5d elastically. Due to this elastic repulsion force of the claws 10A to 10F, the heat shielding plate 4 is urged against the underface of the floor tunnel 2a along the extending direction of the shank 5a of the bolt 5.

Further, since the engagement claws 10A to 10F as a whole are arranged to have a conical-shaped configuration so that their respective tips 10a to 10f depart from the heat shielding plate 4 along the axial direction of the clip 10, namely, the engagement claws 10A to 10F are inclined to the flattened part of the clip body 11, the tip of the shank 5a can be inserted among the engagement claws 10A to 10F easily while being guided by the engagement claws 10A to 10F.

Therefore, even when attaching the heat shielding plate 4 to a specified part where appropriate workability is hardly ensured, for example, the underside of a vehicle, the attachment of the plate 4 to such a part could be completed if only inserting the shank 5a projecting downward into the shank hole 12 of the clip 10. As a result, since the attachment operation dispenses with a special tool, such as caulking tool, without increasing the number of working processes, it is possible for a worker to perform a blind work with improved workability.

In this way, since the engagement claws 10A to 10F serve as guide for the tip of the shank 5a of the bolt 5, there is no need to provided an attachment clip with a slanted guide face as conventional and it is possible to reduce a height of the clip from the abutting face on the heat shielding plate 4 till the engagement position of the tips 10a to 10f with the shank 5a.

Further, since the shank 5a is engaged with the clip 10 through the engagement claws 10A to 10F of six pieces from three or more directions, the resultant fit of the attachment clip 10 can be maintained while urging the heat shielding plate 4 toward the floor tunnel 2a along the axial direction of the bolt 5 generally uniformly.

Accordingly, the heat shielding plate 4 can be fixed to the under-panel 2 certainly while suppressing the plate's pitch and roll to a minimum. Noted that the number of the engagement claws 10A to 10F may be reduced to three pieces in view of accomplishing the above effect.

Again, since the engagement claws 10A to 10F project from the inner periphery of the shank hole 12 inward, the unfolded configuration of the attachment clip 10 does not exceed the size of the clip body 11.

Thus, the material area required for die-cutting one attachment clip from a sheet metal can be reduced in comparison with that of the previously-mentioned attachment clip 6 in earlier technology. Therefore, it is possible to die-cut a number of attachment clips 10 from one sheet metal, thereby allowing the material cost to be reduced and also improving the yield ratio of material without increasing the weight of the clip.

Further, since the engagement claws 10A to 10F are conical-shaped so that their respective tips 10a to 10f depart from the heat shielding plate 4 along the axial direction of the clip 10 at punching (die-cutting), it is possible to reduce the number of manufacturing processes for the attachment clip 10.

Also by this reason, it is possible to suppress increasing of the manufacturing cost.

Further, since the clip body 11 can be apart from the outer flanges 11c, 11c for a predetermined distance by providing the outer flanges 11c, 11c with the abutting lines 13a, 13a and further forming a step-shaped section by of the flanges 11c, 11c and the clip body 11, it is possible to make sure of a large distance between the abutting part 13 of the clip 10 and the tips 10a to 10f of the engagement claws 10A to 10F in engagement with the threads 5d on the shank 5a of the bolt 5, in the direction of the height of the attachment clip 19. That is, it is possible to increase the amounts of elastic deformations in the engagement claws 10A to 10F and the plate springs 11b, 11b.

Therefore, it is possible to increase the elastic repulsion force of the attachment clip 10, thereby enhancing an urging force to retain the heat shielding plate 4.

Moreover, owing to the provision of the abutting lines 13a, 13a, the attachment clip 10 can be brought into line contact with the heat shielding plate 4, allowing the contact area to be reduced.

Therefore, with the reduced contact area between the clip 10 and the plate 4, it is possible to suppress occurrence of rust about the abutment therebetween, improving the rust-proof capability of the attachment clip 10.

Again, since the pair of vertical knobs 14, 14 formed on the clip body 11 are opposed each other on both sides of the shank hole 12, the arrangement allows a worker to easily nip the knobs 14, 15 from both sides of the clip 10 when attaching or detaching the attachment clip 10.

Repeatedly, as shown in FIG. 15, as two pairs of engagement claws 10A, 10F and 10C, 10D adjoining in the circumferential direction of the clip 10 have the engagement tips 10a, 10f and 10c, 10d apart from each other by one pitch p of the threads 5d (FIG. 14) in the direction of the height of the attachment clip 10, even when rotating the attachment clip 10 for detaching it from the bolt 5, the engagement tips 10a to 10f of the engagement claws 10A to 10F are capable of smooth rotational movement along the threads 5d formed on the shank 5a, thereby improving the workability in detaching operation.

Figure 13:
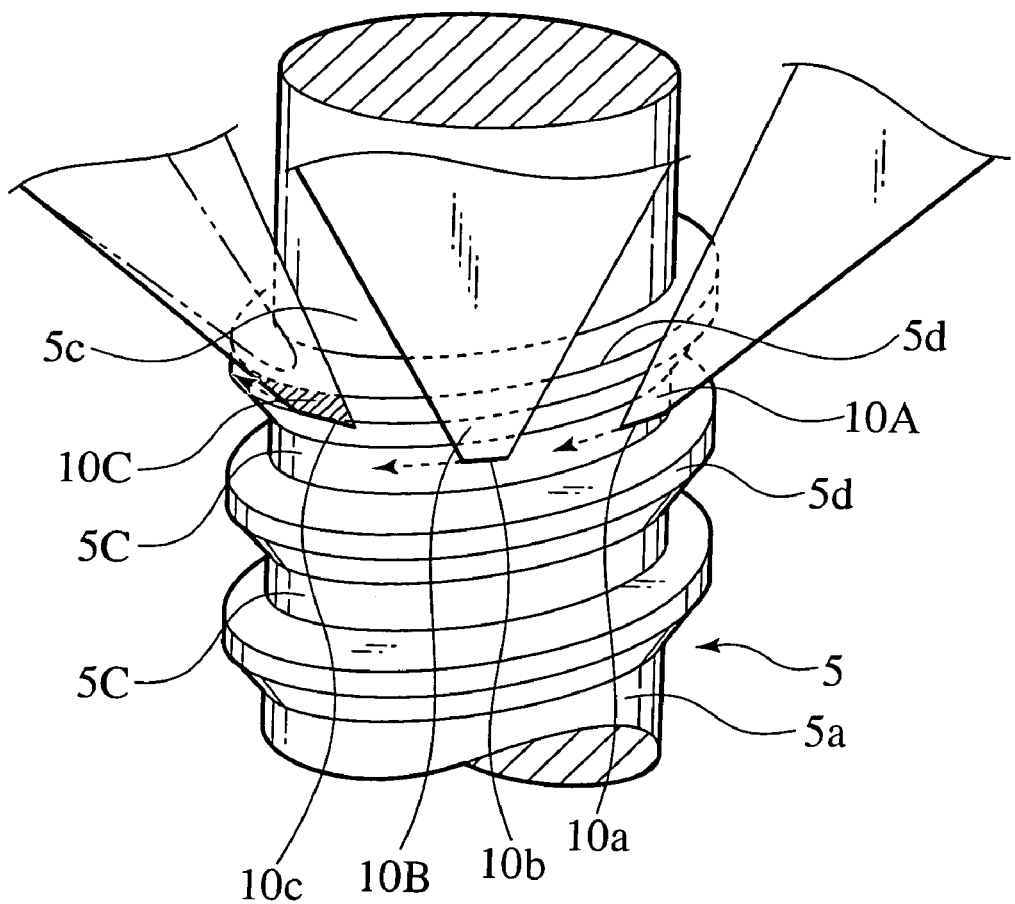
FIG. 13 is a perspective view of an attachment clip having engagement claws at the same level for comparison with the attachment clip of the first embodiment having the engagement claws at different levels.
Figure 14:
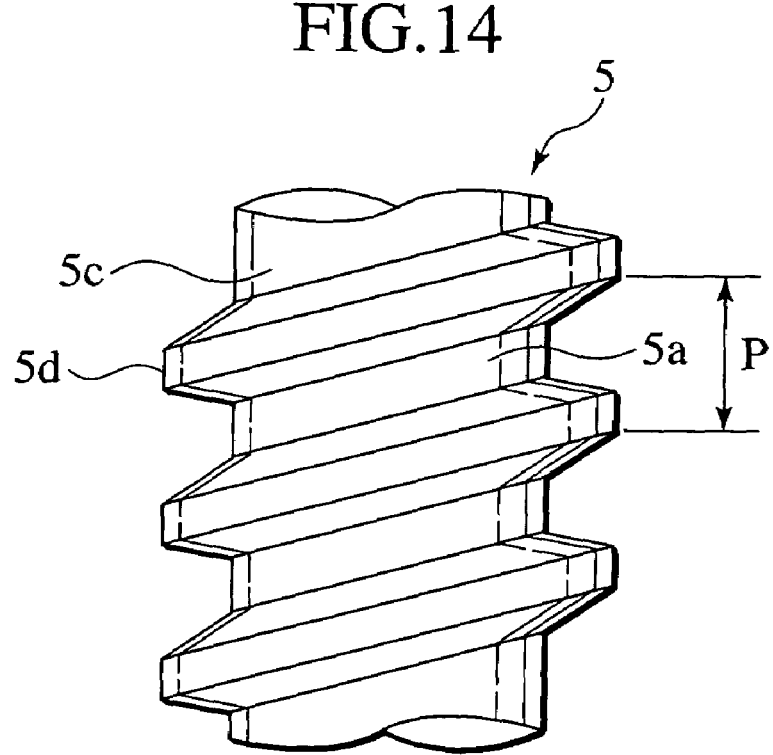
FIG. 14 is a side view of a shank of a bolt used for the attachment clip of the first embodiment and an attachment structure using the clip.

As an example, FIG. 13 illustrates an attachment clip for comparison with the above-mentioned clip 10. Noted that, elements similar to those of the attachment clip 10 are indicated with the same reference numerals, respectively. In this attachment clip of FIG. 13, it is noted that the engagement tips 10a to 10f of the engagement claws 10A to 10F are level with each other.

If the engagement tips 10a to 10f of the engagement claws 10A to 10F are established at the same level in the above way, the so-formed attachment clip is brought into condition that one or more tips (e.g. the tip 10c of FIG. 13) are running onto the thread 5d despite the other tips (e.g. the tips 10a, 10b of FIG. 13) entering the root 5c. Consequently, in the shown case, the tip 10c is elastically and greatly deformed to get warped, thereby causing its surface-contact with a crest of the thread 5d.

Therefore, when detaching the clip from the bolt 5, the tip 10c cannot be subjected to the bolt's spiral guidance due to the above-mentioned surface contact although the other tips 10a, 10b entering the root 5c are about to rotate along the ridgeline of the thread 5d in a spiral manner. Consequently, with the rotations of the tips 10a, 10b shown with arrows of FIG. 13, the engagement tip 10c is transferred from the crest of the thread 5c to the upper root 5c, as shown with two-dot broken line of FIG. 13.

In this way, in the comparative attachment clip mentioned above, since a so-called "step-away" phenomenon may occur in the tips 10c, 10b, 10a, . . . in order by the rotation of the attachment clip, there is the possibility that the attachment clip is hardly to be detached or cannot be detached from the bolt 5 in spite of rotating the clip 10 for a long.

It will be understood that the attachment clip 10 of this embodiment is easy to be detached from the bolt 5 owing to the above-mentioned arrangement where the engagement tips 10a, 10f and 10c, 10d are apart from each other by one pitch.

Furthermore, according to the attachment clip 10 of the first embodiment, since the head part 5b of each bolt 5 forming its root is welded to the upper face of the floor tunnel 2a of the under-panel 2, the attachment clip 10 is hard to be influenced by heat of welding due to the thickness of the bolt 5 in comparison with an arrangement where the attachment clip is fixed to the heat shielding plate, allowing a certain welding of the bolt 5.

[1st. Modification]

Figure 16:
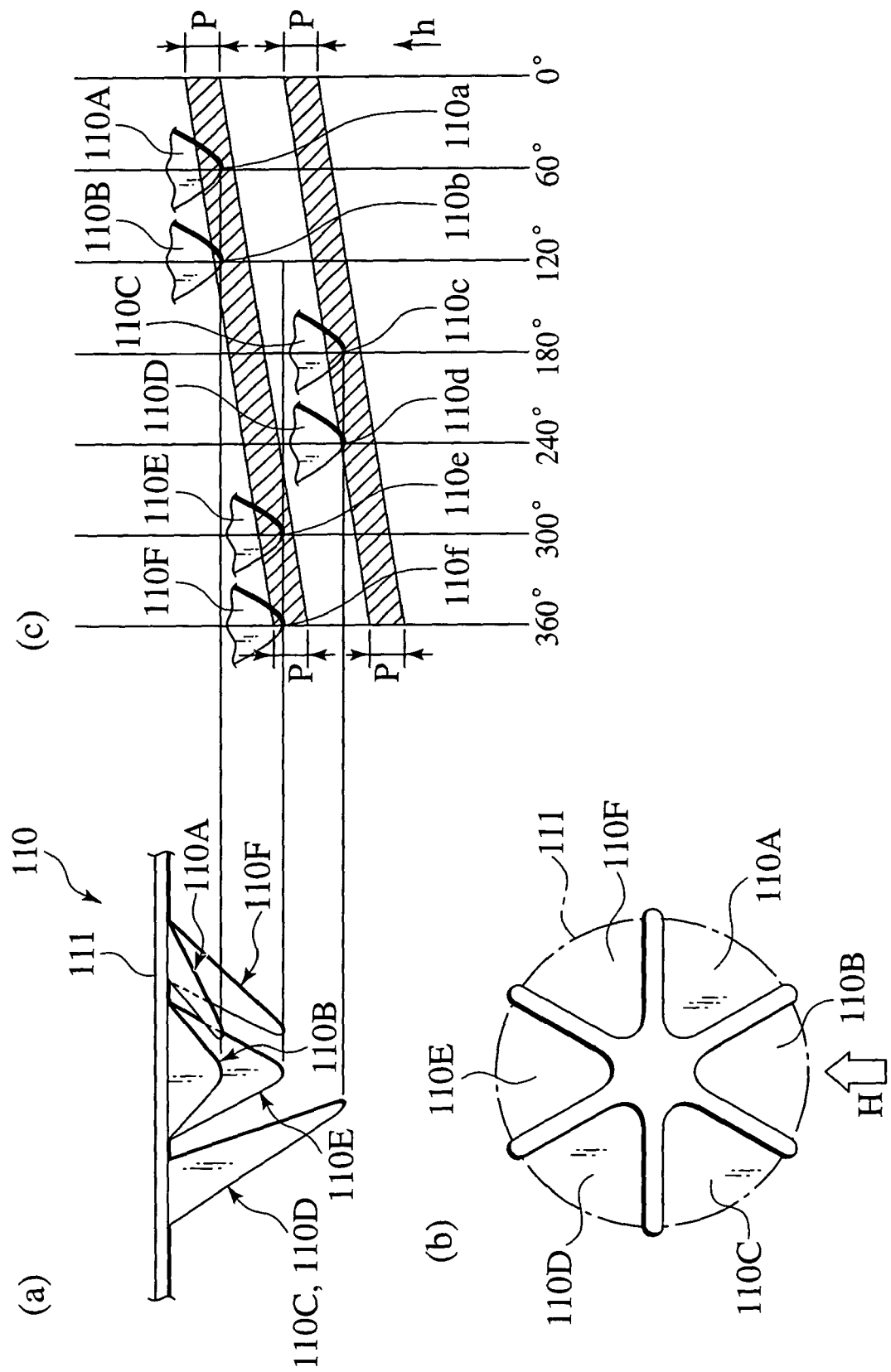
FIG. 16 is a schematic diagram of the attachment clip in the first modification of the first embodiment wherein (a) shows a side view of the engagement claws of the attachment clip, (b) a plan view of the engagement claws and (c) is a pattern view for explaining the heights of the engagement claws corresponding to the view (a).

FIG. 16 shows one modification of the first embodiment of the invention.

According to the modification, an attachment clip 110 is provided with six pieces of engagement claws 110A to 110F for engagement with a bolt (not shown). In this attachment clip 110, two pairs of engagement claws 110A, 110F and 110E, 110D adjoining in the circumferential direction of the clip 110 have the engagement tips 110a, 110f and 110e, 110d apart from each other by one pitch p of the threads 5d (FIG. 14) in the direction of the height of the attachment clip 110, while a pairs of engagement claws 110B, 110C adjoining in the circumferential direction of the clip 110 have the engagement tips 110b, 110c apart from each other by two pitches 2p.

The other constitutions and effects are similar to those of the first embodiment and therefore, the overlapping descriptions are eliminated.

Hereinabove, it will be understood by those skilled in the art that the foregoing descriptions are nothing but one embodiment and the modification of the disclosed attachment clip. Besides these embodiments, various changes and modifications may be made to the present invention without departing from the scope of the invention.

For example, although the attachment clip 10 of the first embodiment is provided with six pieces of engagement claws 10A . . . , the attachment clip 10 may be provided with four, five or three or more pieces of engagement claws in the modifications. Further, as for the shape, number and material of the engagement claws 10A . . . , they are not limited to only those of the first embodiment and the modification if only projecting from the inner periphery of the shank hole 12 inward. For example, the engagement claws 10A . . . may be shaped to be trapezoid, fan, tongue-shaped or the like.

Japanese Patent Application No. 2002-232343, filed on Aug. 9, 2002, is incorporated herein by reference in its entirety.

The scope of the invention is defined with reference to the following claims.

What is claimed is:

1. An attachment clip for attaching a first member to a second member having a bolt projecting therefrom, the first member having a bolt hole formed to allow passage of a shank of the bolt in an axial direction, the attachment clip comprising:

a clip body having an abutting part for abutment against the first member, the clip body having a shank hole for passage of the shank of the bolt and an outer flange formed at an outer periphery of the clip body, wherein the abutting part is formed with an abutting line extending parallel to the outer circumferential edge of the outer flange and extending away from the clip body in the axial direction, and the clip body is apart from the outer flange for a predetermined distance extending away from the clip body in the axial direction, thereby providing the clip body and the outer flange with a step-shaped section; and a plurality of engagement claws formed around the shank hole so as to project from the inner periphery of the clip body to the shank hole inwardly in the radial direction and also inclined to the clip body so that respective engagement tips of the engagement claws depart from the clip body along the axial direction of the attachment clip, thereby providing the engagement claws as a whole with a substantial cone-shaped configuration, wherein the engagement claws can engage with the shank of the bolt of the second member while urging the first member toward the second member along the axial direction of the bolt, wherein the engagement claws include at least two specific claws adjoining in the circumferential direction of the shank hole, wherein the engagement tips of the two specific claws are apart from each other at a predetermined distance extending away from the clip body in the axial direction, and wherein the predetermined distance is equal to one or more pitches of threads formed on the shank of the bolt.

2. The attachment clip of claim 1, wherein the number of the engagement claws is at least three.

3. The attachment clip of claim 1, wherein the clip body is provided with at least one pair of vertical knobs opposing each other on both sides of the shank hole.

4. The attachment clip of claim 1, wherein the first member comprises a heat shielding plate and the second member comprises an under panel of a vehicle.

5. An attachment structure comprising:

a first member having a first bolt hole formed to allow passage of the shank of the bolt in an axial direction;

a second member integrally formed with a bolt having a root and a shank extending from the root; and an attachment clip which is engageable with the bolt to attach the first member to the second member, the attachment clip including a clip body having an abutting part for abutment against the first member, a shank hole allowing passage of the shank of the bolt, and an outer flange formed at an outer periphery of the clip body, wherein the abutting part is formed with an abutting line extending parallel to the outer circumferential edge of the outer flange and extending away from the clip body in the axial direction, and the clip body is apart from the outer flange for a predetermined distance extending away from the clip body in the axial direction, thereby providing the clip body and the outer flange with a step-shaped section; and a plurality of engagement claws formed around the shank hole so as to project from the inner periphery of the clip body inwardly in the radial direction of the shank hole, the engagement claws inclined to the clip body so that respective engagement tips of the engagement claws depart from the clip body along the axial direction of the attachment clip, thereby providing the engagement claws as a whole with a substantial cone-shaped configuration, wherein the engagement claws are engaged with the shank of the bolt while interposing the first member between the clip body and the second member and also urging the first member toward the second member along the axial direction of the bolt, wherein the engagement claws include at least two specific claws adjoining in the circumferential direction of the shank hole, wherein the engagement tips of the two specific claws are apart from each other at a predetermined distance extending away from the clip body in the axial direction, and wherein the predetermined distance is equal to one or more pitches of threads formed on the shank of the bolt.

* * * * *